United States Patent [19]

Comparetto

[11] 4,395,241

[45] Jul. 26, 1983

[54] AMPHIBIOUS SLED DEVICE

[76] Inventor: John E. Comparetto, 108 Cropper St., Chincoteague, Va. 23336

[21] Appl. No.: 317,820

[22] Filed: Nov. 3, 1981

Related U.S. Application Data

[63] Continuation of Ser. No. 18,207, Mar. 7, 1979, abandoned.

[51] Int. Cl.³ ............................................. A63C 15/00
[52] U.S. Cl. ........................................ 441/65; 280/18
[58] Field of Search ............ 280/12 R, 12 A, 12 AA, 280/12 AB, 12.1, 12.11, 18, 19, 21 R, 22; 441/65, 66, 68, 79

[56] References Cited

U.S. PATENT DOCUMENTS

| | | | |
|---|---|---|---|
| 1,315,267 | 9/1919 | White | 440/9 |
| 2,735,115 | 2/1956 | Dees | 441/65 |
| 3,034,800 | 5/1962 | Campbell | 280/18 |
| 3,042,943 | 7/1962 | Katehis | 441/64 |
| 3,319,972 | 5/1967 | Gallaher | 280/18 |
| 3,432,181 | 3/1969 | McKee | 280/18 |
| 3,432,182 | 3/1969 | Solipasso | 280/18 |
| 3,435,471 | 4/1969 | Drennen, Jr. | 441/65 |
| 3,469,554 | 9/1969 | Cole | 440/9 |
| 3,617,070 | 11/1971 | Roberts | 280/21 |
| 3,666,282 | 5/1972 | Buening et al. | |
| 3,684,306 | 8/1972 | Rathman | 280/22 |

FOREIGN PATENT DOCUMENTS 604735 10/1934 Fed. Rep. of Germany .
377670 6/1964 Switzerland .

Primary Examiner—Sherman D. Basinger

[57] ABSTRACT

An amphibious sled has a body with a flexible frontal portion which is deformed inwardly and rearwardly to improve operational characteristics of the sled. In the water version, the flexible frontal portion is deformed downwardly, inwardly and rearwardly to act as catchers for waves and to aid in the propelling of the sled with water power. In land use, the frontal portion is deformed inwardly and upwardly.

9 Claims, 16 Drawing Figures

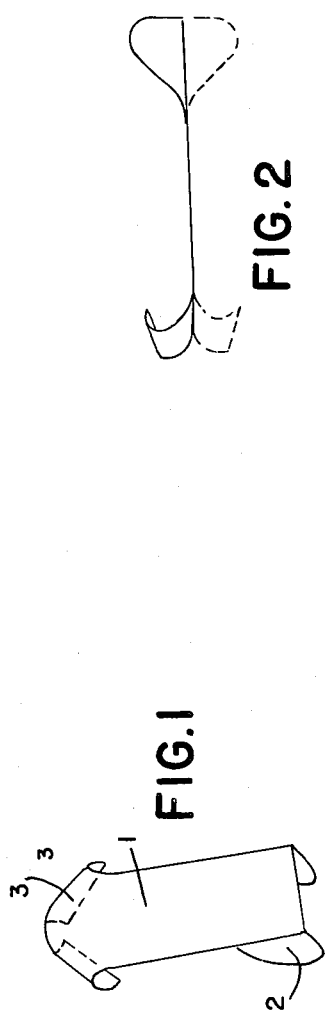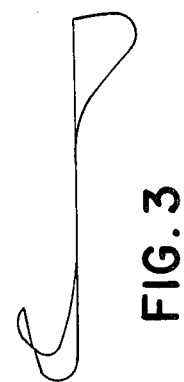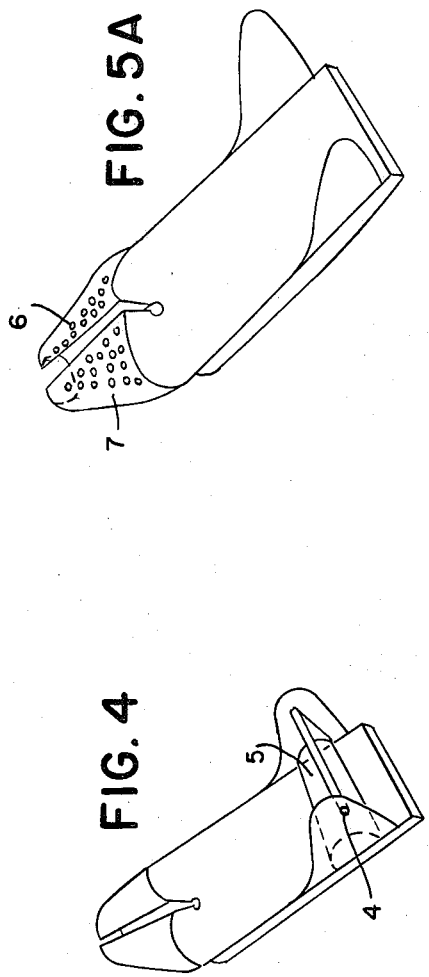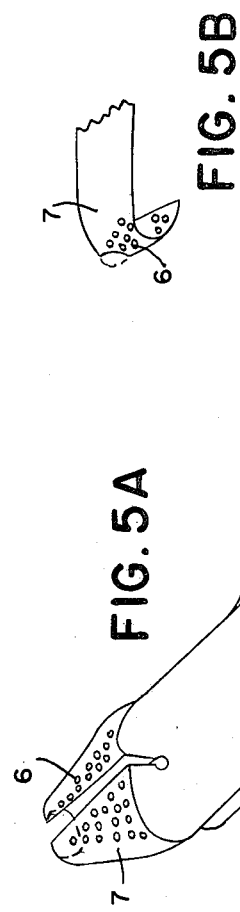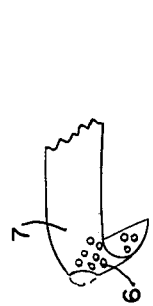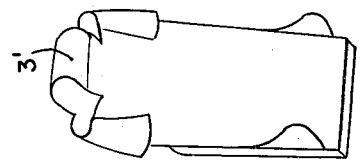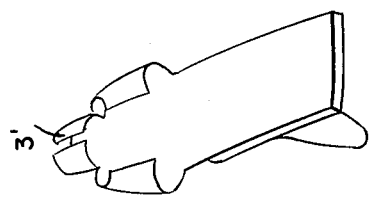

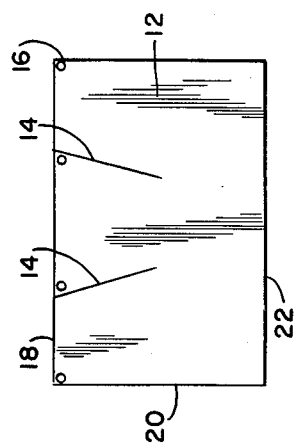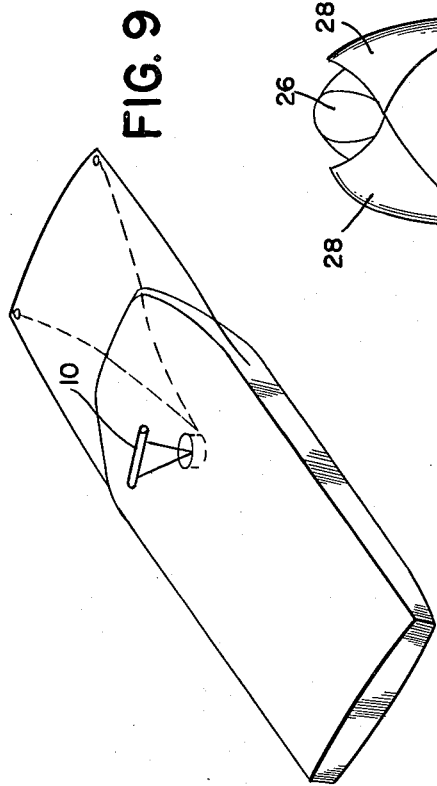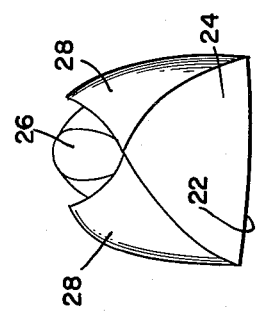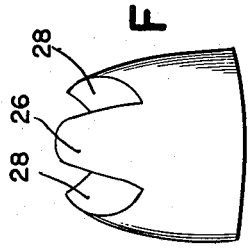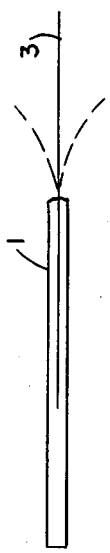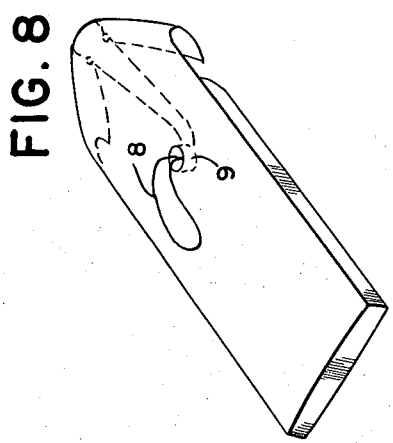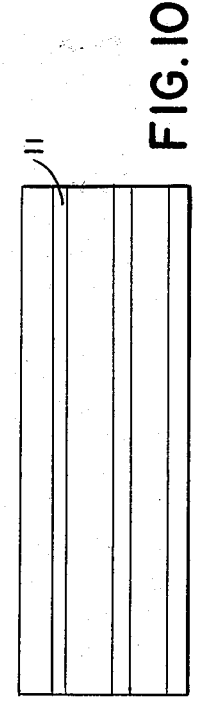

AMPHIBIOUS SLED DEVICE

This application is a continuation of application Ser. No. 18,207, filed Mar. 7, 1979, and now abandoned.

BACKGROUND OF THE INVENTION

Heretofore, various devices have been devised to ride on top and within waves, however, ocean to shore motion only has been considered in the design of these devices.

The present invention takes into account the multimotions of surf waves and allows for this motion in such a manner as to flow with the wave energies. Pre-existing devices with wave catching means have not taken into account the wave turbulence and zigzag forces within waves moving toward shore. Not recognizing these forces prevents these devices from utilizing same and indeed hampers these devices from flowing efficiently with the wave.

The inherent characteristics of this particular device allow it to be equally adaptable to surfing, water skiing, or snow sledding and can be considered an amphibious sled.

OBJECTIVES OF THE INVENTION

An object of the invention is to provide a surface on which a person may be while the device is caught and carried by a breaking wave.

Another object of the invention is to provide means with which to catch the breaking wave action.

Another object of the invention is to utilize the major to shore wave direction while not being impeded by wave turbulence.

A further object of the invention is to provide rearward stabilization and direction guidance by finned means.

A further object of the invention is to utilize the intrinsic wave catching means of the invention to be dually useful as a snow shield sled portion.

A further object of the invention is to allow for the conversion of the finned means to a sled seat.

A still further object of the invention is to allow for a moveable catcher-repeller portion of the device to switch from wave catching to water or snow repelling.

BRIEF DESCRIPTION OF THE DRAWINGS

FIG. 1 shows a perspective view of the invention while deployed or in the surf catching mode.

FIG. 2 shows a reversible side view from snow sled to wave catcher.

FIG. 3 shows wave catching means converted to a water shield for water skiing.

FIG. 4 shows a perspective view of the sled mode with seat between the reversed fins.

FIGS. 5A and 5B show wave catching means with perforations for cutting down turbulence.

FIGS. 6, A, B, and C show conical sections that are laterally placed and centrally placed.

FIG. 7 is a diagrammatic view of the floatation and flexible portions.

FIG. 8 is another view of the invention with a pullcord.

FIG. 9 shows another view of the flexible member attached to a pullcord.

FIG. 10 illustrates a base of a floatation member with elongated metal strips.

FIG. 11 shows a modification of the invention in which the venturi sections are formed from a sheet having slanted cuts.

FIG. 12 is a bottom view of the modification shown in FIG. 11.

FIG. 13 is a top view of the modification shown in FIGS. 11 and 12.

DETAILED DESCRIPTION OF THE INVENTION

In FIG. 1, 1 shows a semi-rigid area where a surfer's body may recline, 2 shows fins, and 3 shows a flexible water catcher. In FIG. 4, 4 shows an axle bolt converting the fins 2 to seat sides. In FIG. 4, 5 shows a seat in place. In FIG. 5A, 6 shows the perforations that may be needed to reduce drag or wave turbulence. Part 7 shows a perforation-free area of the reversible flexible water catcher and corresponds to the area for repelling of water or snow in the water skiing or the snow sledding modes respectively.

While the flexible member can be made to flex in tobogan fashion in a simple curve, it is the purpose of this invention to utilize the flexible member to form a venturi up in the front portion of the device to allow the device to flow more readily with the wave.

FIGS. 6, A, B, and C show a lateral arrangement of venturi sections in a different configuration of the flexible member. FIG. 6A shows member 3 flattened out in a non-deployed state. FIG. 6B shows the central section 3' in a simple tobogan curl, while FIG. 6C shows 3' as a central venturi.

FIG. 7 shows the flexible member 3 sandwiched within the buoyant member 1. The flexible member need not be sandwiched within but may be affixed to either side of the buoyant member. While the flexible member could be made of a frameword that is bendable with cloth or other suitable fabric stretched over it, the best method would be using a flexible plastic such as polycarbonate attached to a buoyant member such as ethafoam.

In FIG. 8 we have an example of the device with the fins removed. The apparatus is also depicted with a nylon cord 8 centrally deployed from the surf side of the wave catcher to the riders side through a central opening 9 within the buoyant member. In testing a mode of the device as depicted in FIG. 8, the following took place. As the wave broke and moved from stern to bow of the apparatus, the cord was pulled upward by the rider, thrusting the flexible funneled member deep into the wave. The effect was immediate with rapid forward movement of the device. In the above mode, the device was straddled by the inventor. This seated bobsled position might be optimal for wave riding by one or more persons. This mode of riding the device lends itself well to the seat member that allows for this bobsled position. If used on breaking waves in this manner, then the unit is flipped fin side up to accommodate the seat structure unless detachable fins are used.

FIG. 9 shows a picture of the device with the flexible member in a non-deployed state and further shows the nylon cords going through the central member to a cross piece 10 that may allow for better manueverability. If an uneven pull is placed on each of the cords singly, then the venturi shifts from a central position therefore shifting the direction of travel through the wave. This ability to shift the venturi from a central position by pulling more aggressively on one cord than the other can also be utilized with the device being pulled backward from a boat. It could only be expected to allow for a very small amount of turning since the venturi direction would not be drastically affected.

FIG. 10 shows the bottom of the floatation member with metal strips 11 in the floatation material to accommodate the hard snow and ice surfaces.

As shown in FIGS. 11, 12, and 13 another preferred form of of the invention uses a single flexible sheet 12 for attachment to body 1. Diagonal cuts 14 slant inward from a leading edge. Grommets 16 provide fastening means near corners of the leading edge 18 and lateral edges 20, and in the center section corners near the leading edges.

In use grommets 16 are juxtaposed and fastened such as by a pin or ropes. A rope may extend through an opening to vary the venturi shapes and particularly their round or oval cross sections and openings.

Trailing edge 22 of the flexible section connects to the leading edge of body 1 shown in the other drawings.

The bottom 24 of the flexible section is shown in FIG. 12; the top is shown in FIG. 13. Three venturis are formed from the sheet—central venturi 26 and lateral venturis 28.

The three venturis provide power and stability in a device which is easily and economically made and which readily assembles from a flat sheet immediately before use.

While the invention has been described with reference to specific embodiments, modifications and variations of the invention may be made without departing from the scope of the invention which is defined in the following claims.

What is claimed:

1. A sled for use over ice, snow, and water, said sled comprising:
a semi-rigid buoyant member adapted to support a user;
a flexible member attached to said buoyant member and extending beyond one end thereof;
a centrally located opening;
a cord having two ends, each end being attached to said flexible member substantially at a corner thereof, said cord passing through said opening and enabling said user to form a venturi-like passage with said flexible member.

2. A sled as in claim 1 wherein a user can steer said sled by pulling on said cord so as to change the location of the venturi-like passage.

3. A sled as in claim 1 wherein said venturi-like passage can be used to propel said sled over the water by reacting with a wave formed by said water.

4. A sled for use over ice, snow, and water, said sled comprising:
a semi-rigid buoyant member adapted to support a user;
a flexible member attached to said buoyant member and extending beyond one end thereof;
at least two cuts formed in said flexible member extending inwardly from an outer end of said flexible member, said cuts forming at least four corners in said flexible member, said corners being brought together to form venturi-like passages in said flexible member.

5. A sled as in claim 4 wherein said sled can be steered with said venturi-like passages.

6. A sled as in claim 4 wherein said venturi-like passages can be used to propel said sled in the water by reacting with waves formed by said water.

7. A sled for use over ice, snow, and water, said sled comprising:
a semi-rigid buoyant member having two sides and an end and adapted to support a user;
a flexible member attached to said buoyant member and extending beyond said end thereof;
said flexible member having at least two portions, each portion extending beyond a respective side of said buoyant member;
said flexible member further having a third portion, said third portion extending beyond the ends of said at least two portions;
said at least two portions and said third portion being used to form venturi-like passages in said flexible member.

8. A sled as in claim 7 wherein said venturi-like passages can be used to steer said sled.

9. A sled as in claim 7 wherein said venturi-like passages can be used to propel said sled in water by reacting with waves formed by said water.

* * * * *